United States Patent [19]
Gatto, Sr.

[11] 3,802,113
[45] Apr. 9, 1974

[54] FISHING ROD CARRYING CASES AND TACKLE BOXES AND METHODS OF MAKING AND USING THE SAME

[76] Inventor: Frank A. Gatto, Sr., 1145 Hallwood Dr., Florissant, Mo. 63033

[22] Filed: Apr. 10, 1972

[21] Appl. No.: 242,612

[52] U.S. Cl. .................. 43/26, 43/54.5 R
[51] Int. Cl. ............................. A01k 97/08
[58] Field of Search ........... 43/26, 54.5; 206/45.14, 206/16

[56] References Cited
UNITED STATES PATENTS

| | | |
|---|---|---|
| 3,410,018 | 12/1968 | Woolworth ..................... 43/26 |
| 3,171,566 | 3/1965 | Mitchell ..................... 43/54.5 R |
| 3,399,009 | 8/1968 | Slade ..................... 43/26 |
| 3,348,329 | 10/1967 | Seeman ..................... 43/26 |
| 2,650,449 | 9/1953 | Suring ..................... 43/26 |
| 2,097,185 | 10/1937 | Hall ..................... 43/26 |

Primary Examiner—Robert Peshock
Assistant Examiner—J. Q. Lever

[57] ABSTRACT

A fishing rod carrying case and tackle box comprising housing means which essentially consists of a box provided with an opening therein closable by a lid, a tray provided with partition means operably mounted within said housing means such that a plurality of chambers are formed therein, said portions being provided with a plurality of rod securing means.

1 Claim, 4 Drawing Figures

FISHING ROD CARRYING CASES AND TACKLE BOXES AND METHODS OF MAKING AND USING THE SAME

BACKGROUND OF THE INVENTION

Many articles are available today as combination fishing tackle boxes and rod carrying cases. Of essential importance to the sportsman, considering the environment of use, is the size and space utilization efficiency of the article.

Devices presently available are objectionable in that they are usually too bulky or if not too bulky do not provide adequate tackle storage means. Further, the devices which provide adequate storage facilities are usually too bulky and are too complicated and large to be manufactured economically.

SUMMARY OF THE INVENTION

In the present invention a combination fishing rod carrying case and tackle box is contemplated which involves simplicity of design and ease of manufacture.

In the preferred embodiment it is an object of the present invention to provide such a device which is economically and simply manufactured.

It is another object of the present invention to provide such a device which is simple and easily used.

It is a further object of the present invention to provide such a device which is easily stored when not in use.

It is a further object of the present invention to provide such a device which allows ready access to either a rod or tackle simply and without interference with other objects stored in the device.

These together with other objects and advantages which will become subsequently apparent, reside in the details and construction and operation as more fully hereinafter described and claimed, reference being had to the accompanying drawings forming a part hereof, wherein like numerals refer to like parts throughout, and in which;

DETAILED DESCRIPTION OF INVENTION

Figure 1:
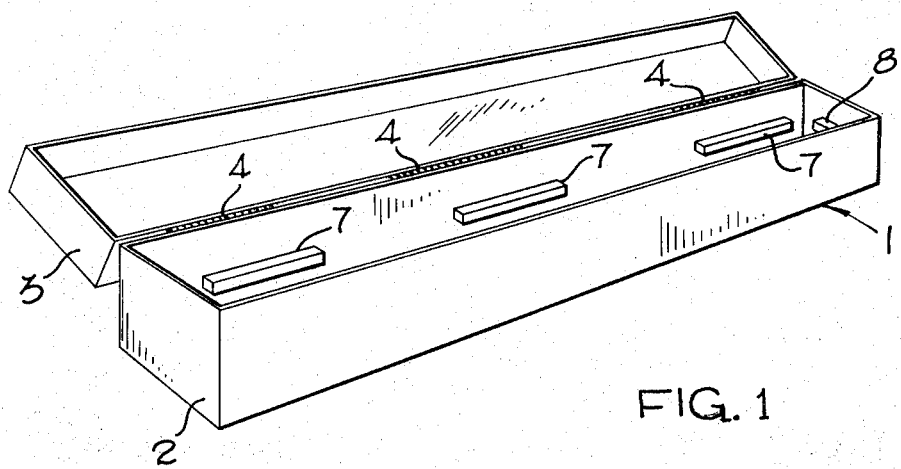
FIG. 1 is a perspective view of a combination tackle box and rod carrier with the tray removed constructed in accordance with and embodying the present invention.

Referring now in more detail and by reference characters to the drawings which illustrate practical embodiments of the present invention, FIG. 1 is a perspective view of a combination tackle box and rod carrier constructed in accordance with and embodying the present invention with the intended contents thereof removed. As shown in FIG. 1 the base element of the invention is box, 1, which is provided with chamber portion 2, and lid portion, 3, which are jointed together by hinges. Three hinges, 4, are shown in FIG. 1, however in another embodiment of the present invention (not shown in the drawings) chamber portion, 2, and lid portion, 3, would be joined by a single hinge running essentially the length of lid portion, 3.

Figure 2:
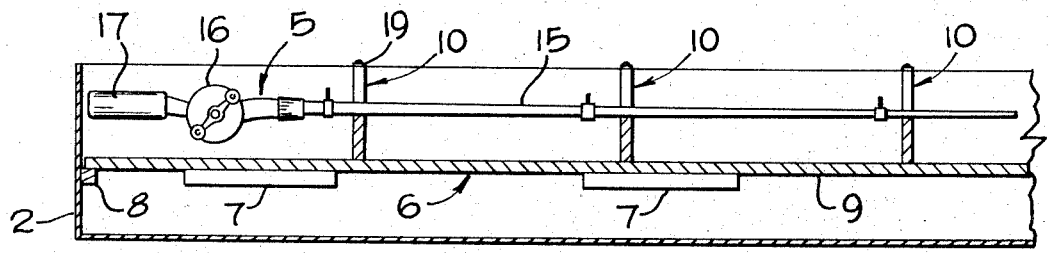
FIG. 2 is a partial sectional view of the device shown in FIG. 1 with the tray and a rod and reel added.

Further details of the invention herein are shown in FIG. 2, which is a partial sectional view of the box, 1, shown in FIG. 1, with rod and reel, 5, installed in tray, 6.

Figure 3:
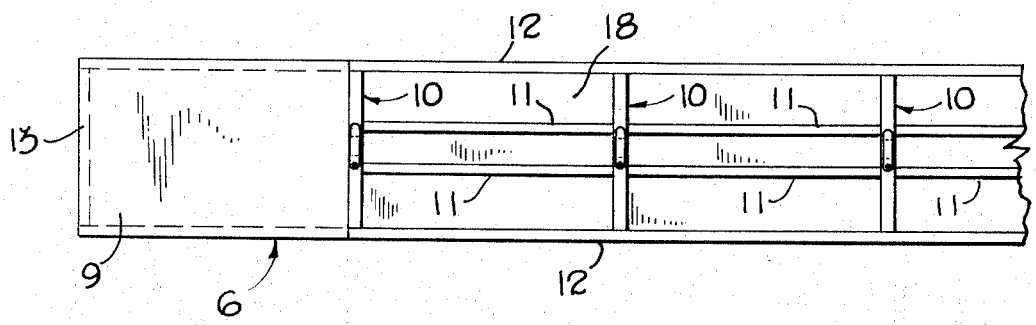
FIG. 3 is a partial plan view of the tray used in the device illustrated in FIG. 1 and FIG. 2.
Figure 4:
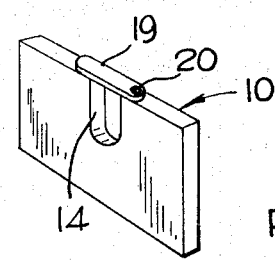
FIG. 4 is a perspective view of a divider used in the tray shown in FIG. 2 and FIG. 3.

In the preferred embodiment of the invention herein there is provided, as shown in FIG. 2, chamber portion, 2, which is provided with lateral flange elements, 7, and end flange elements, 8. Flange elements, 7, and, 8, provide support within chamber portion, 2, for tray, 6. Tray, 6, as shown in FIGS. 2 and 3 comprises base portion, 9, and upright dividers, 10, and, 11, and sidewalls, 12. As shown in FIG. 2 and FIG. 4, dividers, 10, are provided with recesses, 14, which accept rod, 15, of rod and reel, 5. Recesses, 14, are closed by flexible gates, 10, which are secured to dividers, 10, by fasteners, 20. Gates, 19, are constructed of a springy material which will yield when rod, 15, is inserted into recess, 14, and then spring back when rod, 15, rests at the bottom of recess, 14. It should be clear from the drawings that dividers, 11, may be placed in tray, 6, in many configurations and the configuration shown in FIG. 3 is just one of many.

As shown in FIG. 2, and FIG. 3, dividers, 10, are disposed in tray, 6, so as to provide sufficient space for handle, 17, and reel, 16, of rod and reel, 5. By constructing tray, 6, in this manner, rod and reel, 5, may be placed in tray, 6, fully assembled and ready for use.

Dividers, 10, and, 11, may be constructed in a unitary manner with base portion, 9, and walls, 12, or dividers, 10, and, 11, may be secured to associated walls by conventional techniques such as providing slots in wall surfaces in which the end edges may be disposed.

That portion of tray, 6, in which, rod and reel, 5, is disposed may be open as shown in the drawings or closed by extending walls, 12, and providing an endwall, 13, as illustrated in dotted lines in FIG. 3. The number and sizes of spaces, 18, which are formed by dividers, 10, and, 11, and walls, 12, may be varied as desired by adding or removing dividers.

Closure means, such as a lock, etc., are not shown in the drawings, however, it is obvious that closure means are to be provided and many conventional devices will serve the purpose. Further a carrying handle would be optional.

While I have illustrated and described the preferred embodiment of my invention, it is to be understood that changes and modifications in the form, contruction, arrangement and combination of the parts of the fishing rod carrying case and methods of making and using the same may be substituted for those herein shown and described without departing from the nature and principle of my invention.

Having thus described my invention, what I claim as new and desire to secure by United States Letters Patent is:

1. A combination tackle box and rod and reel case comprising,
   - housing means, said housing means consisting of an elongated U-shaped member closed at opposite ends thereby providing an elongated chamber within said housing means,
   - tray means operably mounted in said chamber, said tray means comprising,
   - base means,

- transverse wall divider means operably mounted on said base means and disposed transverse to the longitudinal axis of said housing,
- first longitudinal wall divider means operably mounted on said base means, and disposed longitudinal of said housing,
- second longitudinal wall divider means operably mounted on said base means and disposed parallel to said first longitudinal wall divider means,
- said transverse wall divider means provided with recesses in the upper portion thereof,
- gate means operably mounted on the upper portion of said transverse wall divider means,
- lid means operably mounted on said housing means, and
- closure means operably mounted on said housing means.

* * * * *